(12) United States Patent
Aroya (10) Patent No.: US 7,634,805 B2
(45) Date of Patent: Dec. 15, 2009

(54) USE OF NETWORK ADDRESS TRANSLATION FOR IMPLEMENTATION OF STATEFUL ROUTING

(75) Inventor: Ishai Ben Aroya, Haifa (IL)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/382,221

(22) Filed: Mar. 5, 2003

(65) Prior Publication Data

US 2004/0177274 A1 Sep. 9, 2004

(51) Int. Cl.
- G06F 15/16 (2006.01)
- G06F 17/00 (2006.01)
- G06F 9/26 (2006.01)
- G06F 9/34 (2006.01)
- G06F 9/00 (2006.01)
- H04L 29/06 (2006.01)

(52) U.S. Cl. .......................... 726/13; 713/154; 711/202
(58) Field of Classification Search ................. 713/154; 726/13
See application file for complete search history.

(56) References Cited

U.S. PATENT DOCUMENTS

| | | | |
|---|---|---|---|
| 5,613,136 A * | 3/1997 | Casavant et al. | 712/28 |
| 6,052,785 A * | 4/2000 | Lin et al. | 726/5 |
| 6,493,765 B1 * | 12/2002 | Cunningham et al. | 709/245 |
| 6,584,567 B1 * | 6/2003 | Bellwood et al. | 713/171 |
| 6,728,885 B1 * | 4/2004 | Taylor et al. | 726/24 |
| 6,772,210 B1 * | 8/2004 | Edholm | 709/226 |
| 6,845,452 B1 * | 1/2005 | Roddy et al. | 726/11 |
| 6,944,706 B2 * | 9/2005 | Schain et al. | 710/312 |
| 6,978,383 B2 * | 12/2005 | Boyle et al. | 726/15 |
| 7,031,311 B2 * | 4/2006 | MeLampy et al. | 370/392 |
| 7,058,973 B1 * | 6/2006 | Sultan | 726/12 |
| 7,073,046 B2 * | 7/2006 | Sasvari | 711/217 |
| 7,149,892 B2 * | 12/2006 | Freed et al. | 713/151 |
| 7,193,966 B2 * | 3/2007 | Gupta et al. | 370/231 |
| 7,193,996 B2 * | 3/2007 | Dobbins et al. | 370/392 |
| 7,228,412 B2 * | 6/2007 | Freed et al. | 713/153 |
| 2002/0161899 A1 * | 10/2002 | Yamaguchi et al. | 709/227 |
| 2003/0161310 A1 * | 8/2003 | Dobbins et al. | 370/392 |

OTHER PUBLICATIONS

Chang, Rocky K.C. and Fung, King P. "Transport Layer Proxy for Stateful UDP Packet Filtering". Seventh International Symposium on Computers and Communications. Pub. 2002. Relevant pp. 595-600. Found on the World Wide Web at: http://ieeexplore.ieee.org/stamp/stamp.jsp?tp=&arnumber=1021735&isnumber=21983.*

* cited by examiner

Primary Examiner—Christopher A Revak
Assistant Examiner—Jeremiah Avery
(74) Attorney, Agent, or Firm—Lee & Hayes, PLLC (57) ABSTRACT

Systems and methods are described for using network address translation (NAT) for implementation of stateful routing. A firewall (or firewall server) filters communications between a first host and a second host at a firewall socket layer. Destination addresses for data packets coming into the firewall are translated to an internal (socket) address of the firewall. Source addresses for data packets sent from the firewall are translated to an address of the sending host. As a result, the receiving host sees the data packets as coming from the sending host. Translation rules applied during the communications are stored in a rules module and are applied to all packets having a particular source and a particular destination.

26 Claims, 6 Drawing Sheets

|  | IF SOURCE = | AND DEST = | MODIFY: | TO: |
|---|---|---|---|---|
| 410 | 192.168.33.22/1025 | 172.23.10.20/80 | Dest. | 192.168.33.1/3001 |
| 412 | 192.168.33.1/3001 | 192.168.33.22/1025 | Source | 172.23.10.20/80 |
| 414 | 172.23.10.1/3003 | 172.23.10.20/80 | Source | 192.168.33.22/1025 |
| 416 | 172.23.10.20/80 | 192.168.33.22/1025 | Dest. | 172.23.10.1/3003 |

USE OF NETWORK ADDRESS TRANSLATION FOR IMPLEMENTATION OF STATEFUL ROUTING

TECHNICAL FIELD

The systems and methods described herein relate to data transmission over a distributed network. More particularly, the described systems and methods relate to using network address translation (NAT) to implement stateful routing.

BACKGROUND

Increased network security requirements have driven computer network providers and users to require network security measures, such as implementation of one or more firewalls on a network, that provide data security. A firewall enhances security using various methods, including, among other things, packet filtering.

Packet filtering allows a network to control the flow of Internet Protocol (IP) packets to and from a server. IP packet filters are a set of rules that include specific match criteria, e.g. source address, source port, destination address, destination port, etc. Packet filters also include an action to perform on traffic that match one or more of the match criteria, e.g. pass, block, etc.

Dynamic packet filtering is supported by some firewalls. With dynamic packet filtering, ports open automatically only as required for communications and ports close when the communication ends. This approach minimizes the number of exposed ports, in either direction, and provides a high level of network security.

For stateful inspection, a the source and destination of the traffic indicated in the IP header, and the port in the Transmission Control Protocol (TCP) or User Datagram Protocol (UDP) header are inspected to identify the network service or application used.

Dynamic packet filters enable opening a port only in response to a user's request and only for the duration required to satisfy that request, reducing the vulnerability associated with open ports. Some advanced firewalls determine which packets can be transferred from TCP and UDP connections transparently to the socket level of the firewall (server). Using this technology, the firewall can capture connections between two hosts, inspect and possibly modify the information transmitted by way of the connection.

One limitation of this technology is that it only operates in one direction. In other words, a port opened for communication with a host on a network only communicates with that particular host. To communicate with another host, a new port is opened with the other host. Communications between the hosts must utilize both ports in the firewall.

Figure 1A:
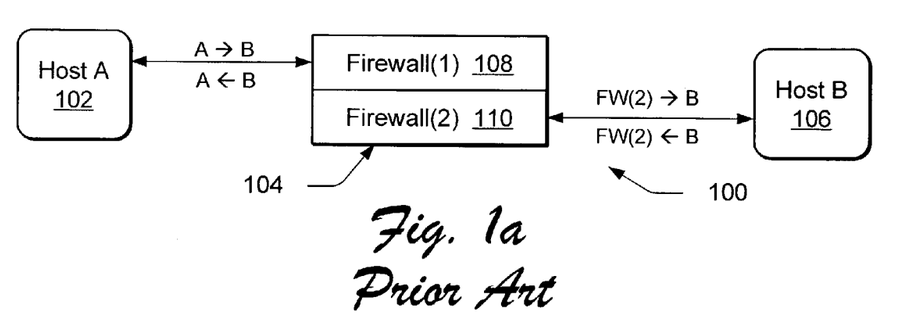
FIG. 1a is a simplified block diagram of an exemplary prior art partial network configuration.

FIG. 1a depicts a simplified prior art network diagram 100 having a Host A 102, a firewall 104 and a Host B 106. When Host A 102 transmits a packet to Host B 106, the packet it initially transmitted to a first socket in the firewall 104 (Firewall(1) 108). The connection shown from Host A 102 to Firewall(1) 108 indicates a source of Host A 102 with a destination of Host B 106. The packet is inspected at the firewall 104. The firewall 104 then transmits the packet to Host B 106 from a second socket in the firewall 104 (Firewall(2) 110). For this connection, the packet indicates a source of Firewall(2) 110 and a destination of Host B 106. Packet transmission from Host B 106 to Host A 102 is similar to, but reversed from, the previous description.

One problem that results is that Host B 106 cannot determine the original source of the packet to be Host A 102. Host B 106 can only access the address of the firewall 104 (Firewall (2) 110).

SUMMARY

The systems and methods described herein provide for the use of network address translation (NAT) in the implementation of stateful routing. When a connection is established from a first host to a firewall for packets intended for a second host, the firewall translates the original destination in the packet to an alternate destination within the firewall (i.e. a firewall socket). A rule regarding the translation is entered in a rules table and is followed for all packets received identifying the same source and destination. In addition, a second corresponding rule is also entered for the reverse situation, i.e. packets sent from the firewall socket to the first host are translated to have the source identify the second host.

For example, when a firewall detects a new connection, it re-directs the packets received on the connection to a first firewall socket. A rule is entered that directs that any packets received from the first host to the second host are to be directed to the first firewall socket. A corresponding rule is entered that directs packets having a source of the first firewall socket and a destination of the first host to be changed to indicate the source as being the second host. The incoming packets are then inspected at the socket level of the firewall.

After the packets are inspected (and assuming they pass inspection), the packets are forwarded to the second host from a second firewall socket. However, the source of the packets—which is, in actuality, the second firewall socket—is altered to identify the first host as the source. A third rule is entered that directs any packets having the second socket as a source and the second host as a destination are to have the sources altered to identify the first host. Therefore, when the second host receives the packets, the second host can properly identify the packets as coming from the first host. A fourth rule corresponding to the third rule is entered that directs any packets having the second host as a source and the first host as a destination are to be translated to have the destination be the second socket.

As a result, firewall socket layer filtering (i.e. stateful inspection) can occur at a firewall socket level while still preserving a routing effect (two hosts receive packets with the source address equal to the other host).

BRIEF DESCRIPTION OF THE DRAWINGS

The same numbers are used throughout the drawings to reference like features and components.

DETAILED DESCRIPTION

Systems and methods for using network address translation (NAT) for implementation of stateful routing are described below. In the following discussion, reference will be made to the drawings described above. Like reference numeral are use to identify like parts that may be shown in more than one drawing.

Exemplary Partial Network Configuration

Figure 1B:
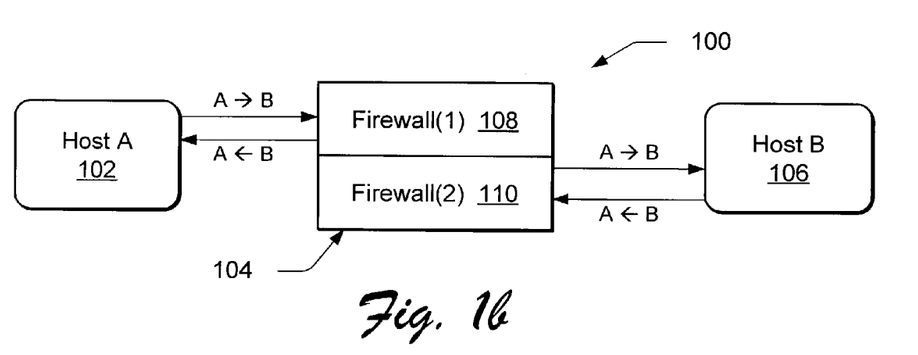
FIG. 1b is a simplified block diagram of an exemplary partial network configuration showing the use of address translation with stateful inspection at a firewall socket level.

FIG. 1b is a simplified block diagram of the exemplary partial network configuration 100 shown in FIG. 1a, but showing the use of address translation with stateful inspection at a firewall socket level. The configuration 100 shows how the source or destination of packets transmitted between Host A 102 and Host B 106 via the firewall 104.

Packets transmitted from Host A 102 to Firewall(1) 108 that are intended for Host B 106 show a source of Host A 102 and a destination of Host B 106. The translations that occur in the firewall 104 result in the packets that are sent from Firewall(2) 110 to Host B 106 showing a source of Host A 102 and a destination of Host B 106. The translations and perhaps the firewall 104 itself are transparent to the hosts 102, 106.

For packets transmitted in the reverse direction, i.e. from Host B 106 to Firewall(2) 110 and intended for Host A 102, show a source of Host B 106 and a destination of Host A 102. The translations that occur in the firewall 104 result in the packets that are sent from Firewall(1) 108 to Host A 102 identifying Host B 106 as the source and Host A 102 as the destination. Again, the translations are transparent to the two hosts 102, 106.

Exemplary Firewall

Figure 2:
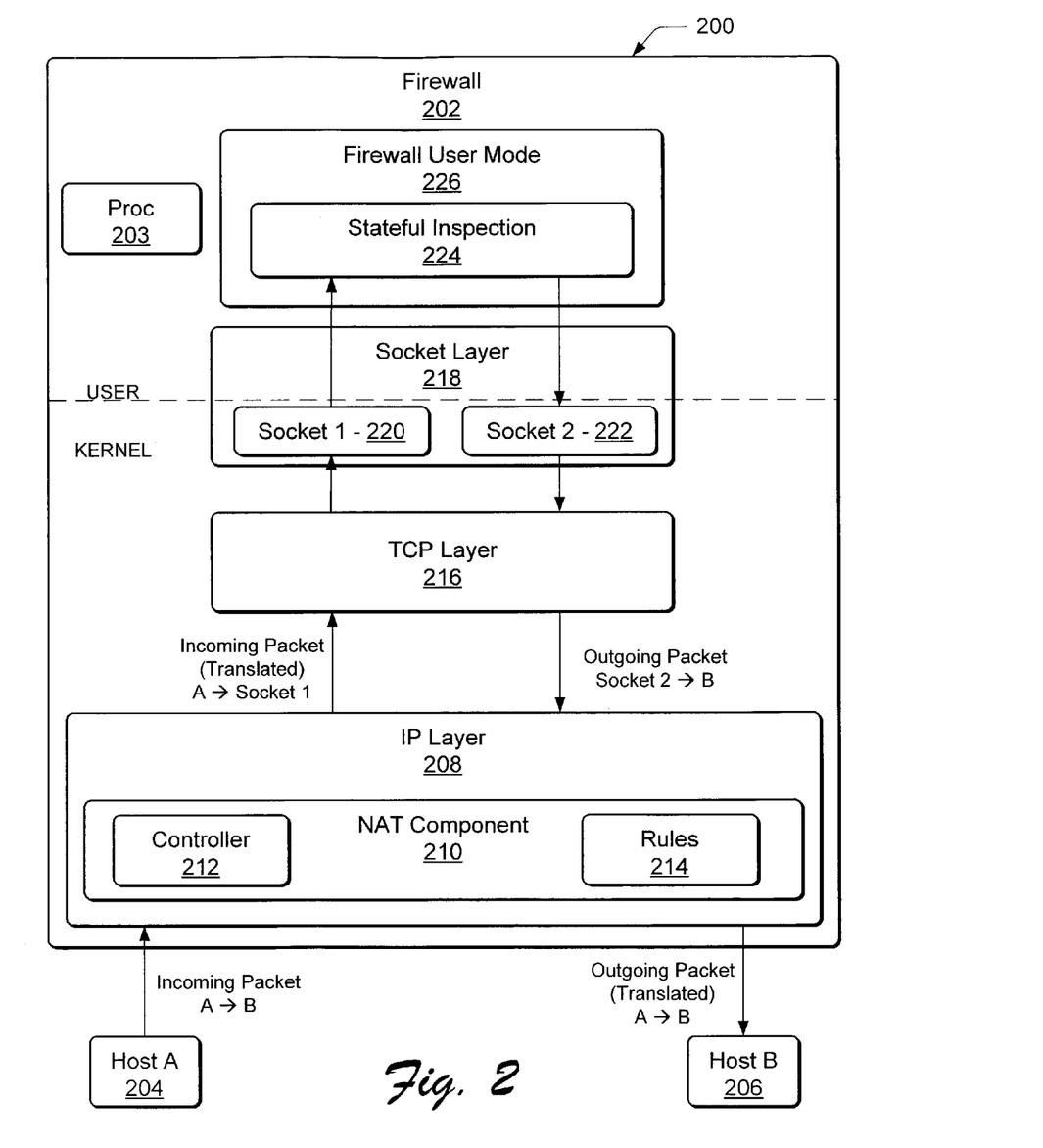
FIG. 2 is a simplified block diagram of an exemplary firewall that inspects packets transmitted between two hosts on a partial network configuration.

FIG. 2 is a simplified block diagram of an exemplary configuration 200 of a firewall 202 that inspects packets transmitted between two hosts (Host A 204 and Host B 206) on a partial network configuration. The firewall 202 may be included in a network server (not shown) or may be implemented as a separate device.

The firewall 202 includes a processor 203 and an Internet Protocol (IP) layer 208 that includes at least a network address translation (NAT) component 210 that has a controller 212 and a rules module 214. The controller 212 may be a software module, a hardware module or a combination of the two, that controls the functionality of the NAT component 210. The rules table 214 stores translation rules that are applied in the systems and methods described herein.

In the following discussion, the rules module 214 is implemented as a rules table stored in firewall memory (not shown). However, there may be other versions of the rules module 214 (hardware, software, firmware, or a combination thereof) implemented without departing from the scope of the claims appended hereto.

The firewall 202 also includes a Transmission Control Protocol (TCP) layer 216 and a socket layer 218 having a first socket (socket 1) 220 and a second socket (socket 2) 222. The firewall also includes a stateful inspection module 224 in a firewall user mode 226. The stateful inspection module 224 inspects and filters packets received by the first and second sockets 220, 222.

The communications between the elements shown in FIG. 2 are indicated by directional arrows. Annotations are included adjacent to the arrows to identify a direction of packet transmissions and the source and destination included in the packets. FIG. 2 shows representative outcomes that result from the translations discussed that occur in the firewall 202. The specifics of the translations will be discussed in greater detail, below, with respect to other figures.

In a communication that originates with Host A 204 for routing to Host B 206, packets are initially transmitted from Host A 204 to the IP layer 208 of the firewall 202. Those incoming (to the firewall) packets designate a source as Host A 204 and a destination of Host B 206. The NAT component 210 receives the packets, allocates a destination socket for the packets and modifies the destination of the packets to identify the destination socket, e.g. socket 1 220. The controller 212 then adds a rule to the rules module 214 that directs any packets received from Host A 204 having a destination of Host B 206 are to have the destination modified to socket 1 220.

The controller 212 also enters a corresponding rule in the rules module 214 that directs all packets having a source of socket 1 220 and a destination of Host A 204 be modified to identify a source as being Host B 206.

The packets are then directed to socket 1 220 where they can be filtered by the stateful inspection module 224. If the packets are considered safe, the packets are directed to be transmitted to Host B 206 from socket 2 222. Before being transmitted however, the packets are acted on by the NAT component 210, which translates the packet source from the IP address of socket 2 222 to the IP address of Host A 204.

The controller 212 enters a new rule in the rules module 214 that directs all packets having a source address of socket 2 222 and a destination of Host B 206 to be modified to show a source address of Host A 204. A corresponding rule is also entered that directs packets having a source address of Host B 206 and a destination address of Host A 204 to be modified to show a destination address of socket 2 222. The packets are then transmitted to Host B 206 and the appropriate rules are set up for packet transmission between Host A 204 and Host B 206.

Exemplary Methodological Implementation of NAT in Stateful Routing

Figure 3:
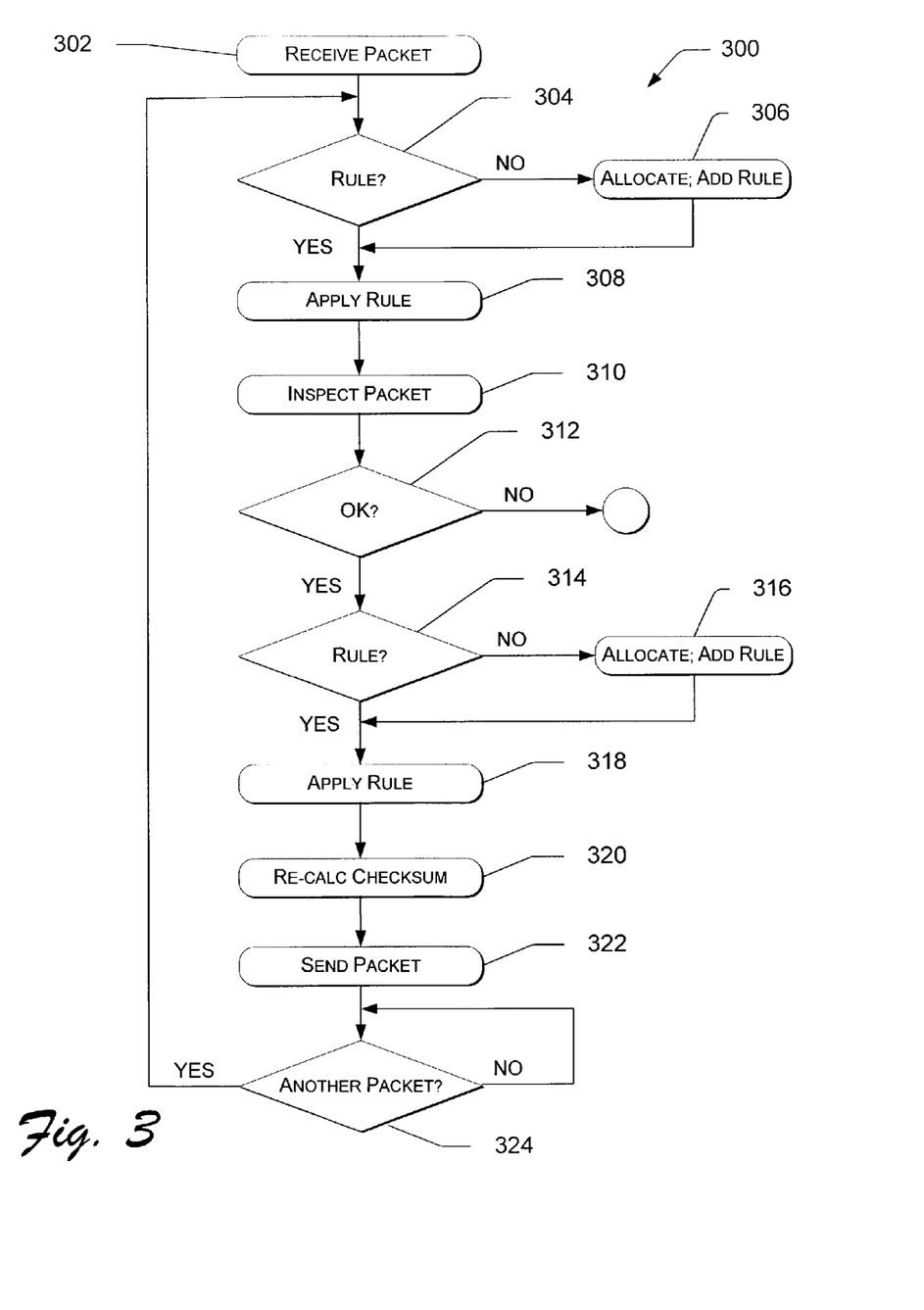
FIG. 3 is a flow diagram depicting an exemplary methodological implementation of using address translation with implementation of stateful routing.

FIG. 3 is a flow diagram 300 depicting an exemplary methodological use of network address translation for implementation of stateful routing. In the discussion of FIG. 3, continuing reference will be made to the elements and reference numerals shown and described in FIG. 2.

At step 302, the firewall 202 receives a packet from Host A 304 intended for delivery to Host B 206. The controller 212 of the NAT component 210 identifies a source address in the packet (Host A 204) and a destination address in the packet (Host B 206). The controller 212 determines if a rule exists in the rules module 214 for packets with the source address and destination address at step 304. If no such rule exists ("No" branch, step 304), then the controller 212 allocates a firewall socket (socket 1 220) to receive the packets and adds a rule to the rules module 214 to direct all future packets received from Host A 206 and destined for Host B 206 to be modified to have socket 1 220 as their destination (step 306).

At this time, the controller 212 enters a corresponding rule in the rules module 214 to direct all future packets having a source of socket 1 220 and a destination of Host A 204 to have their source modified to Host B 206.

The new rule is applied to the packet at step 308. Also, if a rule already exists when the controller 212 checks the rules module 214 ("Yes" branch, step 304), then the rule is simply applied at step 308 without creating a new rule. The packet is then filtered by the stateful inspection module 224 at step 310. If the packet does not pass inspection ("No" branch, step 312), then the packet is dropped.

If the packet passes inspection ("Yes" branch, step 312), then the controller determines if a rule exists governing transmitting the packet out from the firewall 202 at step 314. If a rule exists ("Yes" branch, step 314), then the rule is applied at step 318. If no such rule exists ("No" branch, step 314), then a firewall socket (socket 2 222) is allocated and a rule is added to the rules module 214 that directs all packets having a source of socket 2 222 and a destination of Host B 206 to be modified to have a source of Host A 204. A corresponding rule is also entered that directs all packets having a source of Host B 206 and a destination of Host A 204 to be modified to have a destination of socket 2 222. The appropriate rule is then applied at step 318.

In some security schemes that utilize checksums, a new checksum may have to be computed at step 320 if the translation alters the original checksum. This prevents a security alert and/or the dropping of one or more packets in the event the original checksum transmitted to Host B 206 is incorrect.

The packet is then transmitted to Host B 206 at step 322. Because of the translation that occurred in the firewall 202, Host B 206 will detect the packet as being sent from Host A 204.

If the firewall 202 receives another packet ("Yes" branch, step 324), then the process is repeated from step 304. As long as no other packet is received ("No" branch, step 324), the firewall puts the process on hold while it takes care of other business.

Exemplary Rules Table

Figure 4:
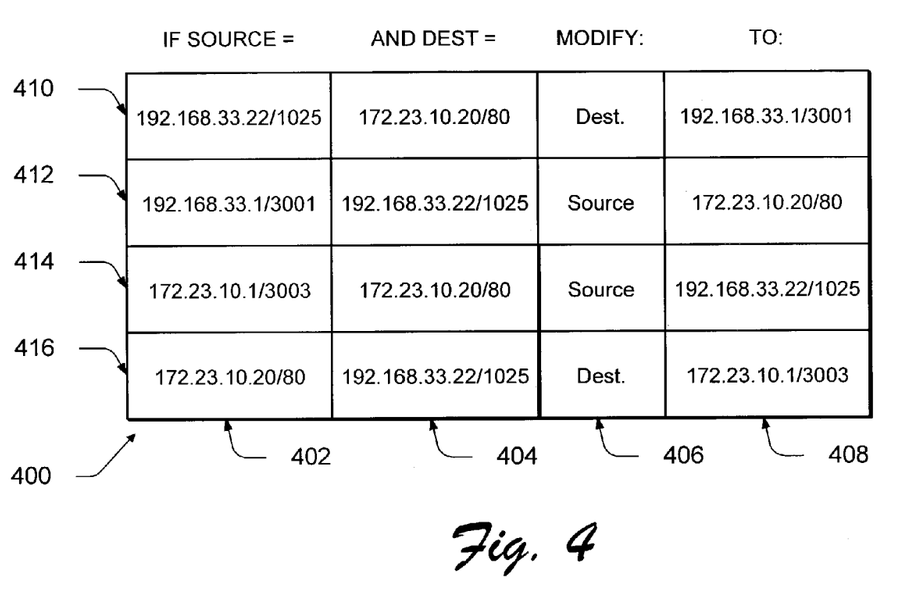
FIG. 4 depicts an exemplary rules table as may be used in the systems and methods described herein.

FIG. 4 depicts an exemplary rules table 400 that may be used with the systems and methods described herein. The rules table 400 is but one way in which translation rules may be stored in the NAT component 210 of the firewall 202 shown in FIG. 2. In the following discussion, continuing reference will be made to the elements and reference numerals included in previous figures.

The following example deals with (IP) addresses to identify particular elements as shown in FIG. 2. In the description that follows, an address formatted as xxx.yyy.zzz.www/ppp identifies an IP address (xxx.yyy.zzz.www) and a TCP/UDP port (ppp). The following elements are associated with the following addresses for this example:

Host A 204 IP address=192.168.33.22
Host A 204 TCP/UDP port=1025
Host B 206 IP address=172.23.10.20
Host B 206 TCP/UDP port=80
Socket 1 220 IP address=192.168.33.1
Socket 1 220 TCP/UDP port=3001
Socket 2 222 IP address=172.23.10.1
Socket 2 222 TCP/UDP port=3003

The rules table 400 includes four columns 402, 404, 406, 408 that are associated with a rule parameter, and four rows 410, 412, 414, 416 that are each associated with a rule. In the present example, column 402 identifies a source address used in the rules 410-416; column 404 identifies a destination address used in the rule 410-416; column 406 identifies whether the rule modifies a source or a destination; and column 408 identifies an address to which the source or destination (indicated in column 406) is modified.

Assume now that Host A 404 sends a data packet intended for Host B 406. When the NAT component 210 of the firewall 202 allocates a socket and creates a rule for this transmission, the rule (row 410) directs that packets having a source address of 192.168.33.22/1025 (Host A 204) and a destination address of 172.23.10.20/80 (Host B 206) have the destination modified to the address of 192.168.33.1/3001 (socket 1 220).

The NAT component 210 also enters a corresponding rule (row 412) directing that packets having a source address of 192.168.33.1/3001 (socket 1 220) and a destination address of 192.168.33.22/1025 (Host A 204) be modified to have a source address of 172.23.10.20/80 (Host B 206).

After stateful inspection, the NAT component 210 allocates socket 2 222 and enters a new rule (row 414). The rule (row 414) directs that a packet having an IP address of 172.23.10.1/3003 (socket 222) and a destination IP address of 172.23.10.20/80 (Host B 206) have its source modified to an IP address of 192.168.33.22/1025 (Host A 204). A corresponding rule (row 416) is also entered that directs packets having a source IP address of 172.23.10.20/80 (Host B 206) and a destination IP address of 192.168.33.22./1025 (Host A 204) have its destination modified to and IP address of 172.23.10.1/3003 (socket 2 220).

The exemplary rules table 400 thus contains appropriate translation rules for communication between Host A 204 and Host B 206 via the firewall 202.

Functional Example of Use of Address Translation Communications

Figure 5:
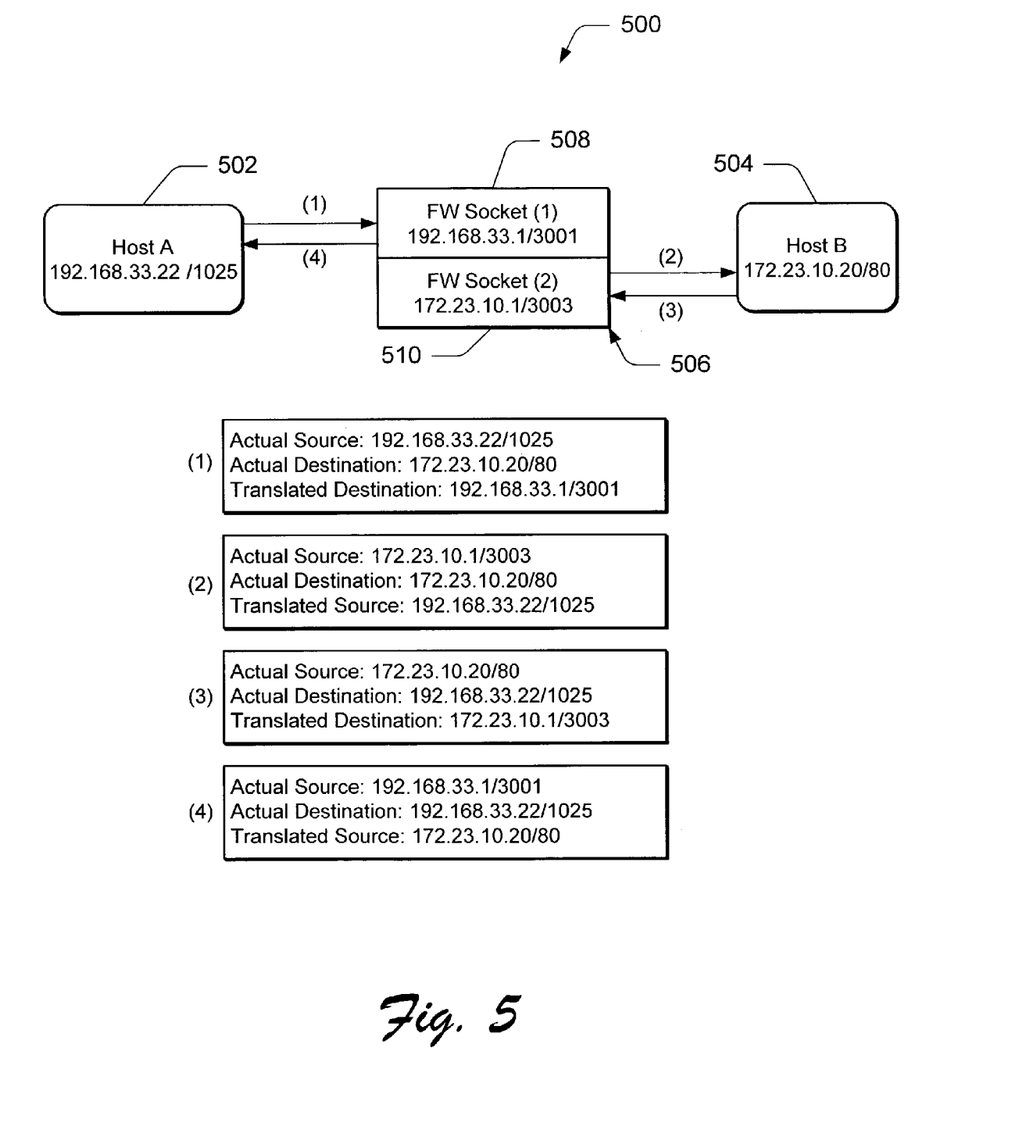
FIG. 5 illustrates a functional example of the use of address translation for communications between two hosts via a firewall performing stateful inspection at a socket level.

FIG. 5 illustrates a functional example 500 of the use of address translation for communications between Host A 502 and Host B 504 via a firewall 506 that utilizes firewall socket 1 508 and firewall socket 2 510 to perform stateful inspection of data packets contained in the communications. The functional example 500 shows the actual sources, actual destinations, translated sources and translated destinations that are effected during different portions of the communications. The same IP addresses shown in the rules table 400 of FIG. 4 that are utilized for similar elements are used in the following discussion. The IP addresses used in this example are:

Host A 502 IP address=192.168.33.22/1025
Host B 504 IP address=172.23.10.20/80
Socket 1 508 IP address=192.168.33.1/3001
Socket 2 510 IP address=172.23.10.1/3003

Communication (1) from Host A 502 to firewall socket 1 508 has an actual source address of 192.168.33.22/1025 (Host A 502), and an actual destination address of 172.23.10.20/80 (Host B 504), and a translated destination address of 192.168.33.1/3001 (firewall socket 1 508). As a result, packets from Host A 502 to Host B 504 are re-directed to firewall socket 1 508.

Communication (2) from firewall socket 2 510 to Host B 504 has an actual source address of 172.23.10.1/3003 (firewall socket 2 510), an actual destination address of 172.23.10.20/80 (Host B 504), and a translated source address of 192.168.33.22/1025 (Host A 502). As a result, packets from firewall socket 2 510 to Host B 504 appear to be coming from Host A 502 (which, indirectly, they are).

Communication (3) from Host B 504 to firewall socket 2 510 has an actual source address of 172.23.10.20.80 (Host B 504), an actual destination address of 192.18.33.22/1025 (Host A 502), and a translated destination address of 172.23.10.2/3003 (firewall socket 2 510). As a result, packets from Host B 504 to Host A 502 are re-directed to firewall socket 2 510.

Communication (4) from firewall socket 1 508 to Host A 502 has an actual source address of 192.168.33.1/3001 (firewall socket 1 508), an actual destination address of 192.168.33.22/1025, and a translated source address of 172.23.10.20/80 (Host B 506). As a result, packets from firewall socket 1 508 to Host A 502 appear to be coming from Host B 506 (which, indirectly, they are).

Exemplary Operating Environment

Figure 6:
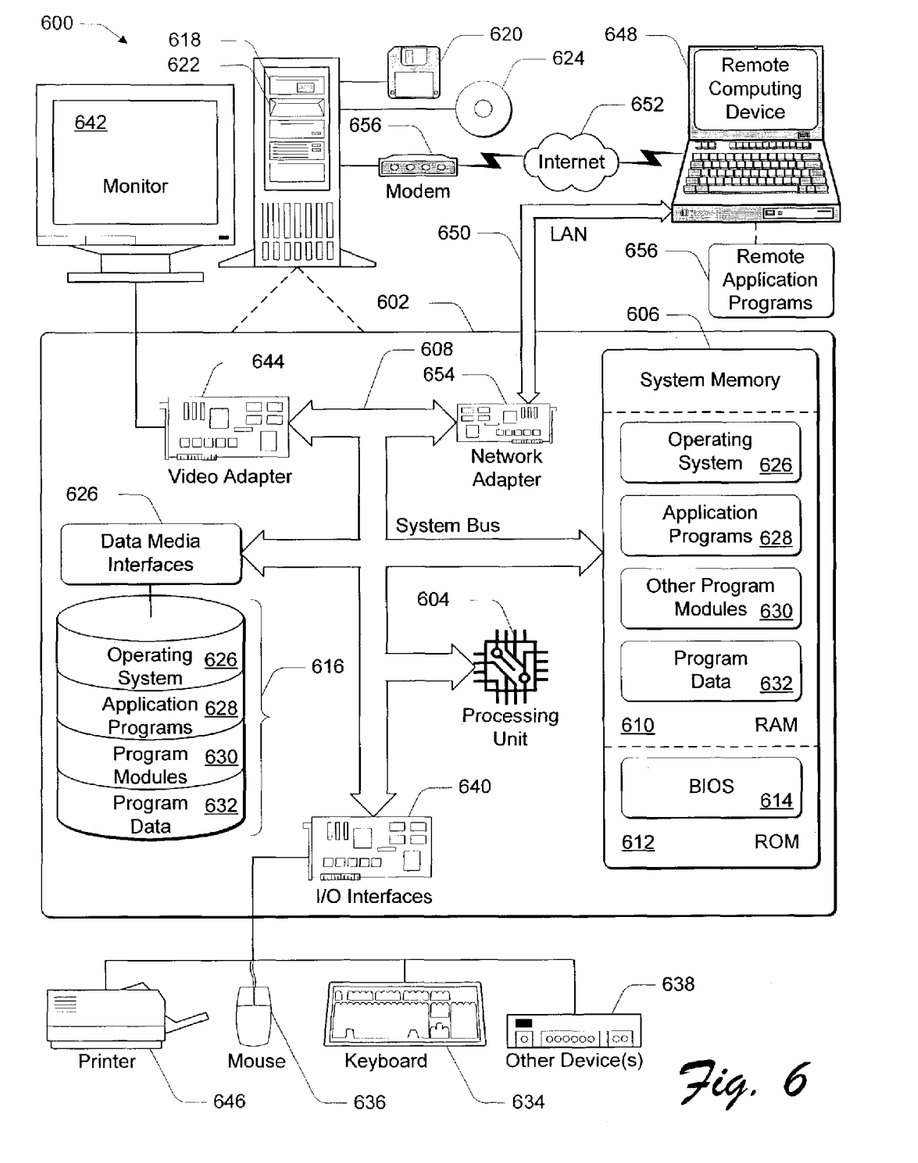
FIG. 6 is a diagram of an exemplary operating environment on which the systems and methods described herein may be implemented.

The various components and functionality described herein are implemented with a number of individual computers. FIG. 6 shows components of typical example of such a computer, referred by to reference numeral 600. The components shown in FIG. 6 are only examples, and are not intended to suggest any limitation as to the scope of the functionality of the invention; the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 602, a system memory 604, and a system bus 606 that couples various system components including the system memory to the processing unit 602. The system bus 606 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 604 includes computer storage media in the form of volatile and/or nonvolatile memory such as read only memory (ROM) 608 and random access memory (RAM) 610. A basic input/output system 612 (BIOS), containing the basic routines that help to transfer information between elements within computer 600, such as during startup, is typically stored in ROM 608. RAM 610 typically contains data and/or program modules that are immediately accessible to and/or presently being operated on by processing unit 602. By way of example, and not limitation, FIG. 6 illustrates operating system 614, application programs 616, other program modules 618, and program data 620.

The computer 600 may also include other removable/non-removable, volatile/nonvolatile computer storage media. By way of example only, FIG. 6 illustrates a hard disk drive 622 that reads from or writes to non-removable, nonvolatile magnetic media, a magnetic disk drive 624 that reads from or writes to a removable, nonvolatile magnetic disk 626, and an optical disk drive 628 that reads from or writes to a removable, nonvolatile optical disk 630 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 622 is typically connected to the system bus 606 through a non-removable memory interface such as data media interface 632, and magnetic disk drive 624 and optical disk drive 628 are typically connected to the system bus 606 by a removable memory interface such as interface 634.

The drives and their associated computer storage media discussed above and illustrated in FIG. 6 provide storage of computer-readable instructions, data structures, program modules, and other data for computer 600. In FIG. 6, for example, hard disk drive 622 is illustrated as storing operating system 615, application programs 617, other program modules 619, and program data 621. Note that these components can either be the same as or different from operating system 614, application programs 616, other program modules 618, and program data 620. Operating system 615, application programs 617, other program modules 619, and program data 621 are given different numbers here to illustrate that, at a minimum, they are different copies. A user may enter commands and information into the computer 600 through input devices such as a keyboard 636 and pointing device 638, commonly referred to as a mouse, trackball, or touch pad. Other input devices (not shown) may include a microphone, joystick, game pad, satellite dish, scanner, or the like. These and other input devices are often connected to the processing unit 602 through an input/output (I/O) interface 640 that is coupled to the system bus, but may be connected by other interface and bus structures, such as a parallel port, game port, or a universal serial bus (USB). A monitor 642 or other type of display device is also connected to the system bus 606 via an interface, such as a video adapter 644. In addition to the monitor 642, computers may also include other peripheral output devices 646 (e.g., speakers) and one or more printers 648, which may be connected through the I/O interface 640.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 606 via the I/O interface 640, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

CONCLUSION

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. A computer-implemented method comprising computer-executable instructions, the method comprising:
 receiving, at a firewall on a device, a data packet from a first host bound for a second host, the data packet identifying a source address as a first host address and a destination address as a second host address, wherein the firewall on the device is remote from the first host and the second host;
 re-directing the data packet to a first internal location in the firewall on the device by modifying the destination address to an address of the first internal location while retaining an association with the first host address, wherein the first internal location comprises a first firewall socket;
 statefully inspecting the data packet while retaining the association with the first host address;
 allocating a second internal location in the firewall on the device for transmitting the data packet to the second host, wherein the allocating includes modifying the source address of the data packet to be an address of the second internal location while retaining the association with the first host address, wherein the second internal location further comprises a second firewall socket;
 directing the data packet to the second internal location;
 modifying the source address of the data packet to be the first host address; and
 transmitting the data packet to the second host.

2. The method as recited in claim 1 further comprising creating a rule that modifies the destination address of all subsequent data packets sent from the first host to the second host to the address of the first internal location.

3. The method as recited in claim 2, further comprising creating a corresponding rule that modifies the source address of subsequent data packets received that have a source address of the first internal location and a destination address of the first host to have a source address of the second host.

4. The method as recited in claim 1, further comprising creating a rule that modifies the source address of all subsequent data packets sent from the second internal location to the second host to the address of the first host.

5. The method as recited in claim 4, further comprising creating a corresponding rule that modifies the destination address of subsequent data packets received that have a source address of the second host and a destination address of the first host to have a destination address of the second internal location.

6. The method as recited in claim 1, wherein the data packet is one or multiple data packets included in a data transmission between the first host and the second host.

7. The method as recited in claim 1, wherein the data packet is only transmitted to the second host if the data packet successfully passes the inspection step.

8. The method as recited in claim 1, wherein the addresses further comprises internet protocol (IP) addresses.

9. A system implemented at a single location remote from a first host and a second host, the system comprising:
 a processor;
 an Internet protocol (IP) layer configured to intercept data packets from a first host to a second host, the data packets having a source address that is an address of the first host and a destination address that is an address of the second host;
 a translation component configured to allocate a first firewall socket to receive the data packets and to modify the destination address to an address of the first firewall socket while retaining an association with the address of the second host;
 a stateful inspection module configured to filter the data packets; wherein:
 the translation component is further configured to allocate a second firewall socket to transmit the data packets to the second host and to modify the source address of the data packets to the address of the first host; and
 the Internet protocol layer is further configured to transmit the data packets from the second firewall socket to the second host.

10. The system as recited in claim 9, wherein the translation component is further configured to create a first rule associated with the translation of the destination address, the first rule directing all packets having a source address of the first host and a destination address of the second host to be modified to indicate a destination address of the first socket.

11. The system as recited in claim 10, wherein the translation component is further configured to create a second rule corresponding the first rule, the second rule directing that all packets having a source address of the first socket and a destination address of the first host to be modified to indicate a source address of the second host.

12. The system as recited in claim 9, wherein the translation component is further configured to create a third rule associated with the translation of the source address, the third rule directing all packets having a source address of the second socket and a destination address of the second host to be modified to indicate a source address of the first host.

13. The system as recited in claim 12, wherein the translation component is further configured to create a fourth rule that corresponds to the third rule, the fourth rule directing that all packets having a source address of the second host and a destination address of the first host to be modified to indicate a destination address of the second socket.

14. The system as recited in claim 9, further comprising a rules table that contains rules created when the translation component first receives data packets having unique source and destination addresses, each rule describing the translation step so that the translation step can be applied to similar data packets subsequently received.

15. The system as recited in claim 9, wherein the allocation of the second socket only occurs if the data packet is successfully filtered.

16. The system as recited in claim 9, wherein the addresses further comprise Internet protocol (IP) addresses.

17. One or more computer-readable storage media located remotely from a first host and a second host and containing computer-executable instructions that, when executed on a computer, perform a method, the method comprising:
    receiving a data packet having a source address identifying the first host and a destination address identifying the second host;
    allocating a first firewall socket in the one or more computer-readable media to receive the data packet;
    translating the destination address to an address of the first firewall socket;
    performing stateful inspection of the data packet;
    if the data packet passes the stateful inspection, allocating a second firewall socket in the one or more computer-readable storage media for transmitting the data packet to the second host, wherein allocating includes translating the source address of the data packet to an address of the second firewall socket;
    translating the source address of the data packet to that of the first host address; and
    transmitting the data packet to the second host.

18. The one or more computer-readable storage media as recited in claim 17, the method further comprising additional computer-executable instructions that, when executed on a computer, perform the following step:
    creating a first rule describing the translation of the destination address, the first rule directing all subsequent data packets received that have an identical source address and destination address to be modified to show a destination address associated with the first firewall socket.

19. The one or more computer-readable storage media as recited in claim 18, the method further comprising additional computer-executable instructions that, when executed on a computer, perform the following step:
    creating a second rule corresponding to the first rule, the second rule directing all subsequent data packets received that have a source address of the first firewall socket and a destination address of the first host to be modified to show a source address of the second host.

20. The one or more computer-readable storage media as recited in claim 19, the method further comprising additional computer-executable instructions that, when executed on a computer, perform the following step:
    creating a third rule describing the translation of the source address, the third rule directing all subsequent data packets received that have a source address of the second firewall socket and a destination address of the second host to be modified to show the address of first host.

21. The one or more computer-readable storage media as recited in claim 20, the method further comprising additional computer-executable instructions that, when executed on a computer, perform the following step:
    creating a fourth rule corresponding to the third rule, the fourth rule directing all subsequent data packets received that have a source address of the second host and a destination address of the second firewall socket to be modified to show a destination address of the second firewall socket.

22. The one or more computer-readable storage media as recited in claim 17, the method wherein the addresses are Internet protocol (IP) addresses.

23. The one or more computer-readable storage media as recited in claim 17, the method further comprising additional computer-executable instructions that, when executed on a computer, perform the following steps:
    creating one or more rules associated with the translations and describing the translations;
    storing the rules in a rules component;
    referencing the rules component when subsequent data packets are received; and if the rules component contains a rule to be associated with the data packet, based on the source and destination of the data packet, applying the rule to the data packet.

24. A method, comprising:
    receiving, in a firewall, a data packet from a first host, the data packet having a source address of the first host and a destination address of a second host, the first host and second host being physically distinct from the firewall;
    referencing a rules table to locate a rule in the rules table that applies to data packets having a source address of the first host and a destination address of the second host;
    if a rule is found, applying the rule to the data packet;
    if a rule is not found, allocating a first socket to receive the data packet and modifying the destination address of the data packet to an address of the first socket and entering a rule describing the modification into the rules table, the first socket existing within the firewall;
    performing stateful inspection of the data packet;
    if the data packet does not successfully pass the stateful inspection, dropping the data packet;
    if the data packet successfully passes the stateful inspection, referencing the rules table to locate a rule in the rules table that applies to data packets having a source address of a second firewall socket used to send data packets to the second host and a destination address of the second host;
    if a rule is found, applying the rule to the data packet;
    if a rule is not found, allocating the second firewall socket, modifying the source address of the data packet to be the address of the first host and entering a rule describing the modification into the rules table; and transmitting the data packet from the firewall to the second host, wherein the source address of the data packet is the address of the first host and the data packet appears to originate from the first host.

25. The method as recited in claim 24, further comprising:
when a rule associated with modifying the destination address is created and entered into the rules table, creating a corresponding rule the directs subsequent data packets received that have a source address of the first socket and a destination address of the first host to be modified to show a source address of the second host.

26. The method as recited in claim 24, further comprising:
when a rule associated with modifying the source address is created and entered into the rules table, creating a corresponding rule the directs subsequent data packets received that have a source address of the second host and a destination address of the first host to be modified to show a destination address of the second firewall socket.

\* \* \* \* \*